(12) United States Patent
Krauss et al.

(10) Patent No.: US 6,860,518 B2
(45) Date of Patent: Mar. 1, 2005

(54) CORRUGATED PLASTIC PIPE WITH FASTENING PORTION

(75) Inventors: Manfred Krauss, Hettstadt (DE); Sören Schröter, Bamberg (DE)

(73) Assignee: Fraenkische Rohrwerke Gebr. Kirchner GmbH & Co. KG, Konigsberg (DE)

(*) Notice: Subject to any disclaimer, the term of this patent is extended or adjusted under 35 U.S.C. 154(b) by 0 days.

(21) Appl. No.: 10/218,787

(22) Filed: Aug. 14, 2002

(65) Prior Publication Data

US 2003/0034650 A1 Feb. 20, 2003

(30) Foreign Application Priority Data

Aug. 14, 2001 (DE) .......................................... 101 39 898

(51) Int. Cl.[7] ................................................ F16L 41/00
(52) U.S. Cl. ................. 285/206; 285/139.1; 285/139.2; 285/903
(58) Field of Search ........................... 285/139.1, 139.2, 285/139.3, 141.1, 143.1, 206, 207, 208, 903, FOR 143

(56) References Cited

U.S. PATENT DOCUMENTS

| | | | | |
|---|---|---|---|---|
| 607,316 A | * | 7/1898 | Winters ....................... 285/206 |
| 1,966,731 A | * | 7/1934 | Newman ....................... 285/81 |
| 2,580,818 A | * | 1/1952 | Mundy et al. ................. 285/40 |
| 3,750,444 A | * | 8/1973 | Bittner ........................... 72/78 |
| 3,895,177 A | * | 7/1975 | Muslin ........................ 174/48 |
| 3,986,377 A | * | 10/1976 | Priaroggia ..................... 72/38 |
| 4,406,142 A | * | 9/1983 | Kelstrom et al. ............... 72/98 |
| 4,494,779 A | * | 1/1985 | Neff et al. ................. 285/154.1 |
| 4,613,169 A | * | 9/1986 | Engelhart ................. 285/139.2 |
| 4,616,105 A | * | 10/1986 | Borsh ........................ 174/65 R |
| 4,647,074 A | * | 3/1987 | Pate et al. ..................... 285/64 |
| 4,909,547 A | * | 3/1990 | Guy ........................ 285/148.28 |
| 5,538,294 A | * | 7/1996 | Thomas ....................... 285/55 |
| 5,782,270 A | * | 7/1998 | Goett et al. .................. 138/109 |
| 5,971,444 A | * | 10/1999 | Hawkins ..................... 285/206 |
| 6,129,120 A | * | 10/2000 | Margot ....................... 138/121 |
| 6,209,929 B1 | * | 4/2001 | Ikegami et al. .......... 285/139.2 |

FOREIGN PATENT DOCUMENTS

| | | |
|---|---|---|
| DE | 35 09 231 A1 | 9/1986 |
| DE | 40 40 495 A1 | 7/1992 |
| DE | 198 11 019 A1 | 9/1999 |
| FR | 1316146 A * | 12/1962 ........ 285/FOR 143 |
| GB | 2273324 A * | 6/1994 ................. 285/206 |

* cited by examiner

*Primary Examiner*—James M. Hewitt
(74) *Attorney, Agent, or Firm*—Pendorf & Cutliff

(57) ABSTRACT

A corrugated plastic pipe with an integral fastening section, whereby the corrugated plastic pipe can be fastened to any object by way of the fastening section.

24 Claims, 4 Drawing Sheets

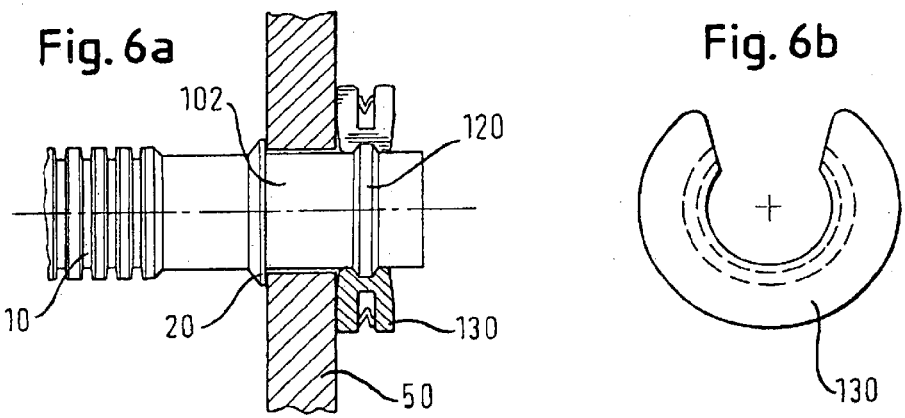
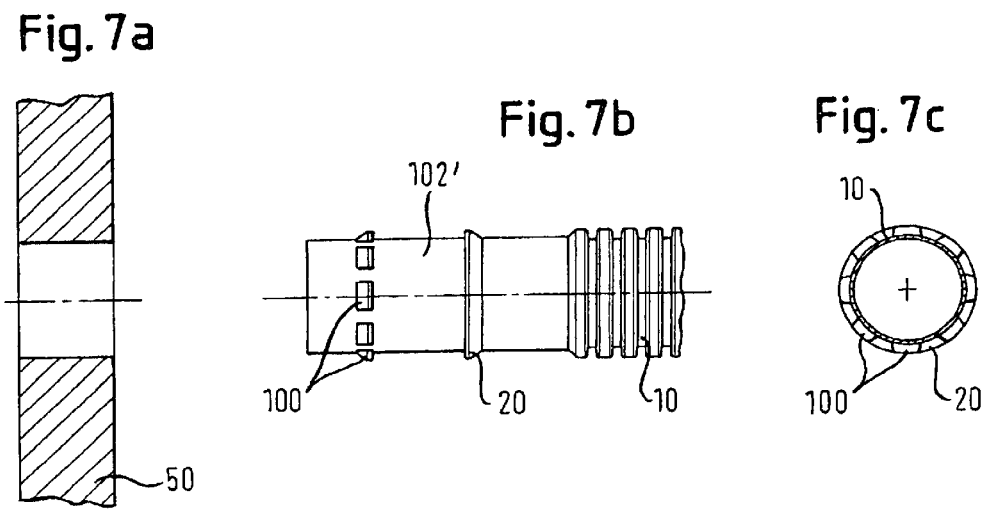
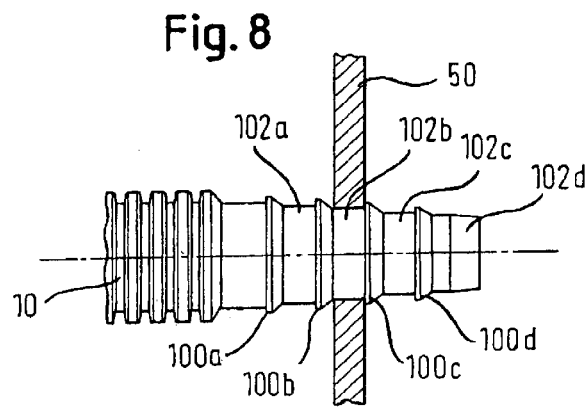

CORRUGATED PLASTIC PIPE WITH FASTENING PORTION

FIELD OF THE INVENTION

The present invention relates to corrugated plastic pipes and processes for the manufacture of a corrugated plastic pipes. In particular, the invention relates to the fastening of corrugated pipes, for example, to or in household appliances, vehicles, machinery and the like.

BACKGROUND ART

According to the prior art, electrical conduits or liquids, potentially also gasses, are guided into or back out of apparatus, switch gear cabinets, apparatus components or the like.

In order to protect electrical cables from damage, they are guided in cable protection conduits, in general corrugated plastic pipes, for example, into switch gear cabinets. In order to abut the corrugated pipes to the corresponding cupboards and to fasten them thereto, whereby the cable must also not be damaged in the transition regions, fastening elements are used in the prior art which are generally referred to as connection fittings or fittings.

Such fittings are manufactured by way of injection molding at comparatively high cost, and the installation of the fittings on a corrugated pipe and further to a switch gear cabinet poses comparatively large labor demands. Furthermore, this connection technology requires space, and manufacturing tolerances lead to a loss in cross-section with respect to the end opening region of the corrugated pipe. Also, when such connections are to be manufactured liquid or gas tight, this results in much increased manufacturing and installation costs.

SUMMARY OF THE INVENTION

It is an object of the present invention to provide a new installation technology for corrugated plastic pipes. It is a further object according to the invention to provide more economical connections of corrugated pipes to switch gear cabinets, machine portions, or the like. It is further an object to reduce the manufacturing demands and the manufacturing costs as well as the installation demands as much as possible. Furthermore, it is an object of the invention to reduce the multiplicity of parts for the fastening of corrugated pipes.

The objects to be solved in accordance with the invention are achieved at least partly with a corrugated plastic pipe in which at least one end is provided with a threaded portion with inner and/or outer thread, which at least on one side of a corrugated pipe section is provided in one piece with the corrugated pipe section.

By manufacturing, for example by way of a corrugator, an endless corrugated plastic pipe which at a certain or variable spacing is provided with threaded portions, the corrugated pipe can be cut in the region of the threaded portion or portions to provide finished corrugated pipe sections which simply have to be inserted with the threaded portion into an opening, for example, at a switch gear cabinet, in order to be locked from the other side with a threaded nut. In this manner, all injection molded parts are obviated which previously were required for the flanging or mounting of a corrugated pipe. Only the locking nut and possibly a sealing washer or an O-ring remain in order to enable a connection which can prevent the ingress of water or the egress of liquid.

Although a conventional corrugation of a corrugated plastic pipe constructed in accordance with the invention can be used as a stop which rests against a wall to which the corrugated pipe is to be connected, it has been proven advantageous when an abutment portion, preferably also a corrugation peak, which however can be modified, is provided between the threaded portion and the corrugated pipe section. It is possible to construct a corresponding corrugation peak, which is practically constructed to have a higher stiffness in a preferred direction, which means opposite to the threading direction of the threaded portion. Such a stabilization structure can be constructed, for example, as a continuously beveled surface. Of course, it is also possible to provide a discontinuously extending surface, whereby in longitudinal section, for example, a step-wise widening can be provided between the corrugation valley and corrugation peak of the abutment portion. The stabilization structure in longitudinal section can also be constructed elliptical, simply beveled, conical or otherwise, when thereby only the stability of the abutment portion is reinforced.

Preferably, the abutment portion is constructed flat on the side of the threaded portion, especially when a sealing washer is to be inserted between the abutment portion and the wall of the body to be connected, such as a switch gear cabinet, before a locking nut is tightened on the threaded portion in order to fasten the corrugated plastic pipe in accordance with the invention.

It should be noted with respect to the abutment portion that it should be able to develop a large resistance and especially the largest possible resistance relative to the force, in order to function as a counter support without disadvantageous deformation.

The abutment portion preferably has at least one circumferential protrusion. Circumferential protrusion can of course conversely also mean a circumferential depression relative to the main surface of the abutment portion, which comes to rest against the body to be connected, for instance a switch gear cabinet. Such a circumferential elevation can lead to a sealing effect during the tightening of the locking nut, when the wall of the body to be connected is flat, which means suitable as sealing surface. When the abutment portion is provided with a circumferential groove, an O-ring, for example, can be inserted into the groove in order to achieve a desired sealing.

The threaded portion of the corrugated plastic pipe in accordance with the invention can of course have any shape, which means it can be constructed as a rounded thread, a pointed thread, a trapezoid thread or any other metric or imperial thread. The threaded portion to be preferred according to the invention can also be replaced by an otherwise constructed fastening portion as a means of equivalent action. Such a fastening portion, for example, can consist of a radially conically tapered region with a latch portion. When this latch portion is guided through a fitting opening, the latch portion is reduced in cross-section and as soon as it has passed the opening, this type of fastening portion expands again and fastens this variant of a corrugated plastic pipe in accordance with the invention to a switch gear cabinet, for example. It is furthermore also possible to form a fastening portion in such a way that it can be fastened for instance in connection with a locking element in that, for example, a cable type locking element engages ribs of the corrugated pipe which pass the opening that belongs to the body to which the corrugated plastic pipe in accordance with the invention is to be fastened. Various manners of fastening are possible which however were not used integrally with the pipe ends of corrugated pipes.

The threaded pipe portion close to the threaded portion or the abutment portion is preferably provided with a structure which enables the installer a slip proof grip on the respective pipe section. Of course, other types of aids can be provided to enable a reliable grip on the pipe. For example, the pipe can be provided with gripping surfaces similar to a nut so that the pipe can be held with a wrench.

To connect two corrugated pipes with one another, it is advantageous to provide a further corrugated pipe section, the further threaded portion of which is constructed as an interior threaded portion. The interior threaded portion can then be screwed onto the threaded portion of the corrugated pipe in accordance with the invention. An inner as well as an outer thread can be equally manufactured with a corrugator. The inner thread can conversely also be used as outer thread, since with the corrugation process, as is known, principally only the outer structure of a corrugated pipe is modified, whereby automatically also the inner structure of a corrugated pipe is formed.

If such a connection between a corrugated pipe section with outer thread and a further corrugated pipe section with inner thread is to be fastened to a housing, for example a switch gear cabinet or the like, whereby the threaded portions at the same time are located in the region of the opening, the further threaded portion can have an end region which is directed away from the corrugated pipe section of the further corrugated pipe. This end region can be provided with a larger diameter and thereby form a further abutment. In this arrangement, a wall, for example of a switch gear cabinet, can be enclosed between the abutment of the corrugated pipe on one side and the abutment of the further corrugated pipe on the other side. The abutments can further be used to sealingly press sealing rings, sealing washers or the like against the switch gear cabinet wall.

The present invention can of course also advantageously be used with corrugated plastic pipes with multiple plastic layers. For example, a corrugated plastic pipe with a corrugated outer layer and a smooth inner layer can be equally advantageously equipped with the features according to the invention.

It can further be an advantage to provide the corrugated plastic pipe in accordance with the invention with a longitudinal slit at least in those regions in which the corrugated pipe section is provided. Cable protection conduits could be fastened, for example, in the engine compartment of a motor vehicle through the screw connection, while the cables themselves are nevertheless accessible through longitudinal slits present for installation or maintenance purposes or the like.

Such a longitudinally slitted corrugated pipe according to the invention can also be provided with closing devices for reversibly closing the slit, for example after the insertion of cables. Various different arrangements are known in the prior art for this purpose.

Although it is preferred according to the invention to produce the threaded portion to be provided in accordance with the invention by way of a corrugator during the continuous manufacture and to cut the continuously manufactured corrugated pipe with threaded portions into individual sections, as desired, such a threaded portion can of course also be provided afterwards by friction welding, adhesion or the like.

The invention is equally directed to a process for the manufacture of corrugated pipes with threaded portions, whereby the manufacture is carried out by way of a continuous corrugation. According to the process of the invention, a thermoplastically deformable tube with at least one plastic layer is continuously extruded. The continuously thermoplastically deformable tube enters into the molding path of a corrugator into which continuously circulating molding die chains molding dies are inserted which mold a threaded portion.

This means that molding dies are inserted into the circulating molding die chains on demand which have an inner profile that corresponds to a threaded portion of the corrugated pipe to be formed in accordance with the invention. This profile is, as is known, molded by the corrugator into the still thermoplastically deformable plastic tube which then cools down.

Although it is possible to achieve with the molding of the threaded portion with a smaller outer diameter already a material concentration in the region of the threaded portion, an additional material concentration can be achieved by slowing down the corrugation or the speed of the circulating molding dies, so that the wall thickness in the region of the threaded portion is advantageously large to mechanically stabilize the corrugated pipe in the region of the threaded portion. It can also be attempted to otherwise achieve a material concentration in the region of the threaded portion.

Thread molding dies for the manufacture of the threaded portion need not be permanently integrated into the molding die chain of a corrugator, but can be added to or removed from the molding die chain on demand so that in this manner corrugated pipes of almost any length can be manufactured.

BRIEF DESCRIPTION OF THE DRAWINGS

The present invention will be further described in the following by way of preferred embodiments with reference to the attached illustrations, whereby further goals, advantages and features of the invention are disclosed.

FIG. 6a is a side elevation of an embodiment with fastening portion in an installed condition;

FIG. 6b is an end view of the position securing device shown in longitudinal section in FIG. 6a;

FIGS. 7a to 7c show an installation situation in cross-section (FIG. 7a) into which an embodiment illustrated in side elevation (FIG. 7b) can be inserted, which embodiment is shown in end view (FIG. 7c); and FIG. 8 is a side elevational view of another embodiment in the installed condition.

DESCRIPTION OF THE PREFERRED EMBODIMENTS

Figure 1:
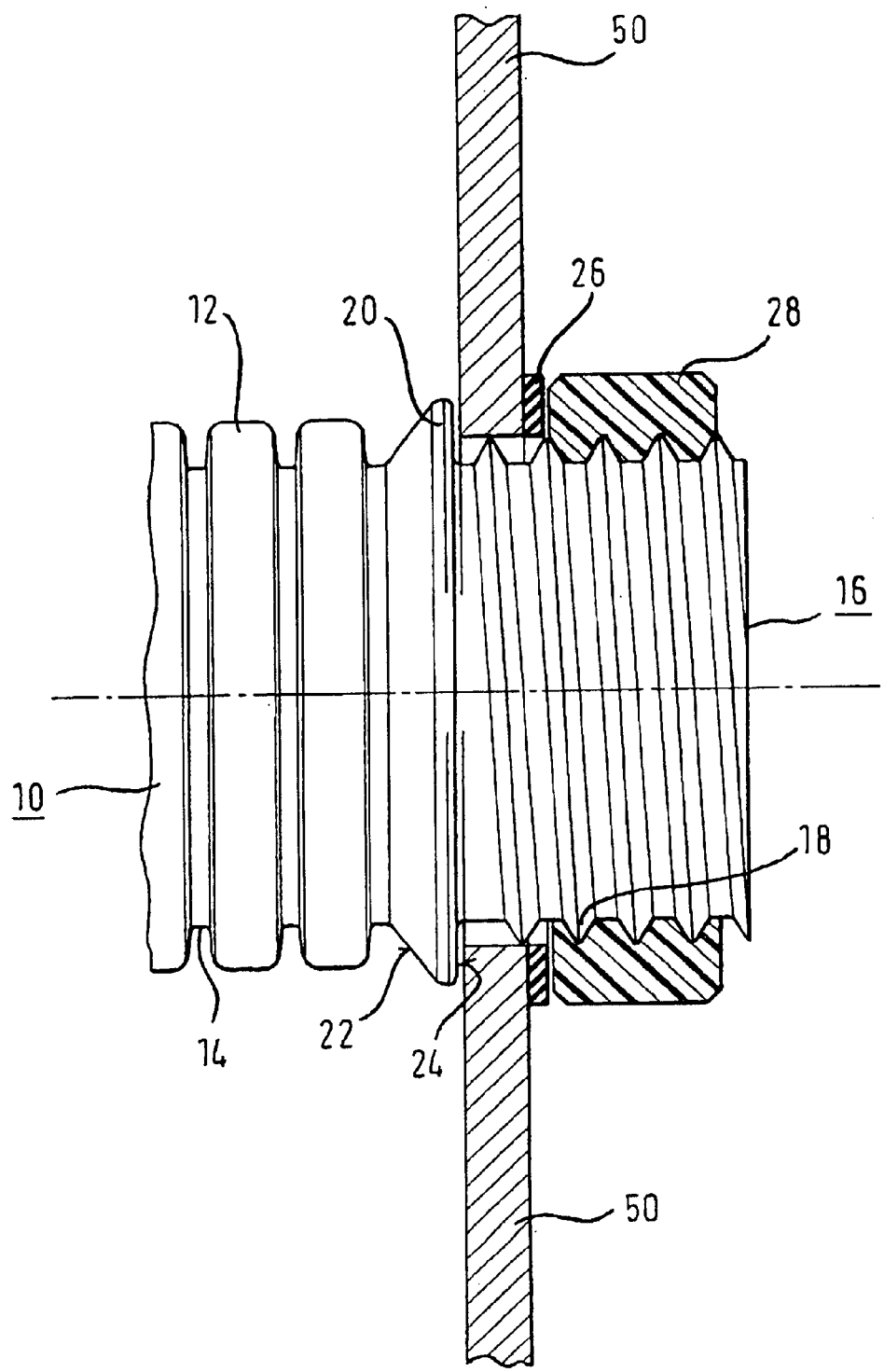
FIG. 1 shows a section through an opening of a housing to be connected by a first embodiment of a corrugated pipe in accordance with the invention, whereby the corrugated pipe in accordance with the invention is shown in side elevation.

Equal or at least functionally equal components are referred to by the same reference numeral throughout the drawings.

FIG. 1 shows a housing, a machine component or the like, for instance also a switch gear cabinet, which is represented by the wall portions 50 illustrated in cross-section. A corrugated pipe 10 with features according to the invention is guided through an opening in the wall portion 50. This corrugated plastic pipe 10 has, as is conventional, corrugation peaks 12 and corrugation valleys 14. One corrugation peak 20 is formed as an abutment, the flat surface 24 of which abuts the edges of the opening in the wall 50 on one side of the wall 50. The surface 24 serves as a counter support for the mechanical load, which occurs upon fastening of the pipe 10 to the wall 50.

The abutment portion 20 has a beveled or conically tapered shape 22 which serves to provide the abutment portion 20 with the required stiffness and distortion resistance which exceeds the mechanical strength of a normal corrugation 12. Of course, a corrugation 12 itself can also serve as abutment portion for certain applications, since even a normal corrugation has a comparatively large mechanical strength in axial direction of the corrugated pipe.

The threaded portion 16 to be provided in accordance with the invention is adjacent the abutment portion. The threaded portion 16 can have any thread 18, for instance a metrical thread or an imperial thread, a rounded thread, a normal pointed thread, a trapezoid thread or the like.

It must be noted that instead of the threaded portion, a generally constructed fastening portion can also be provided, whereby, for example, an only partially circumferential or circumferential support portion is embossed into the cylindrical region of the illustrated threaded connection portion 16, without the portion 16 otherwise being provided with a thread. This here not illustrated embodiment of the corrugated pipe in the invention could also be fastened, for example, with a fork shaped device which can be brought into locking engagement with the counter support portions. An automatically spreading portion can also be incorporated into the cylindrical region 16 and the like. However, for reasons of stability, a threaded portion is preferred in accordance with the invention. The threaded portions 16 and thereby the corrugated pipe 10 in accordance with the invention are fastened in a locking manner by way of a nut or a threaded ring 28. In case additional sealing is desired, a sealing ring 26 can be provided which, for example, is sealingly compressed between the wall 50 and the nut or the threaded ring 28. This sealing ring can of course also be provided between the surface 24 of the abutment portion 20 and the wall 50. A further embodiment with the features according to the invention is apparent from FIG. 2, which is essentially distinguished from the embodiment according to FIG. 1 in that the abutment surface 24 of the abutment portion 28 is provided with circumferentially evenly provided profiles 21. These profiles are deformed on the wall 50 during the fastening of the corrugated pipe 10, as is apparent from FIG. 2a, whereby a sufficient seal can be achieved already without additional sealing means.

Instead of or in addition to the profiles 21, profiles can be provided which allow the inclusion of an O-ring or another type of seal in order to achieve a reliable sealing by way of the additional seal (not illustrated) without further measures.

Figure 2:
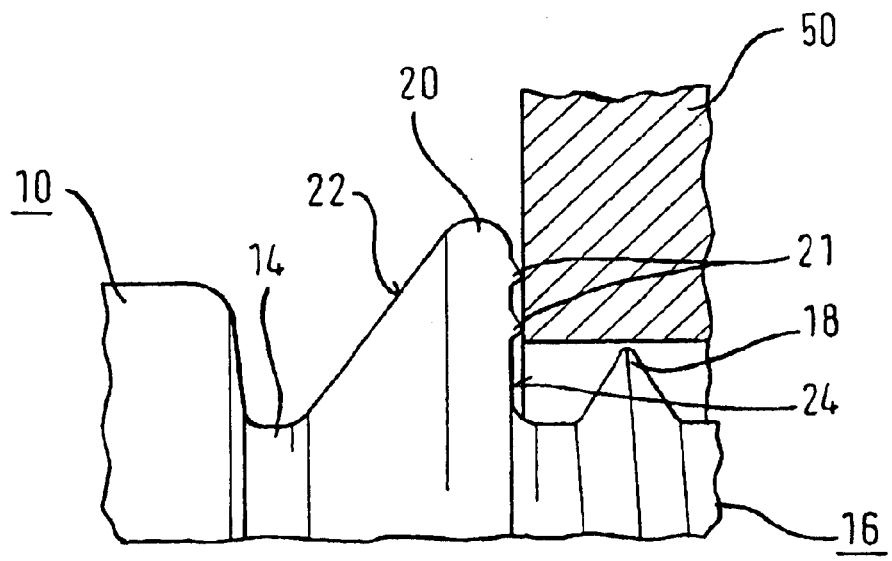
FIG. 2 shows a partial section through a corrugated pipe with features according to the invention.
Figure 2A:
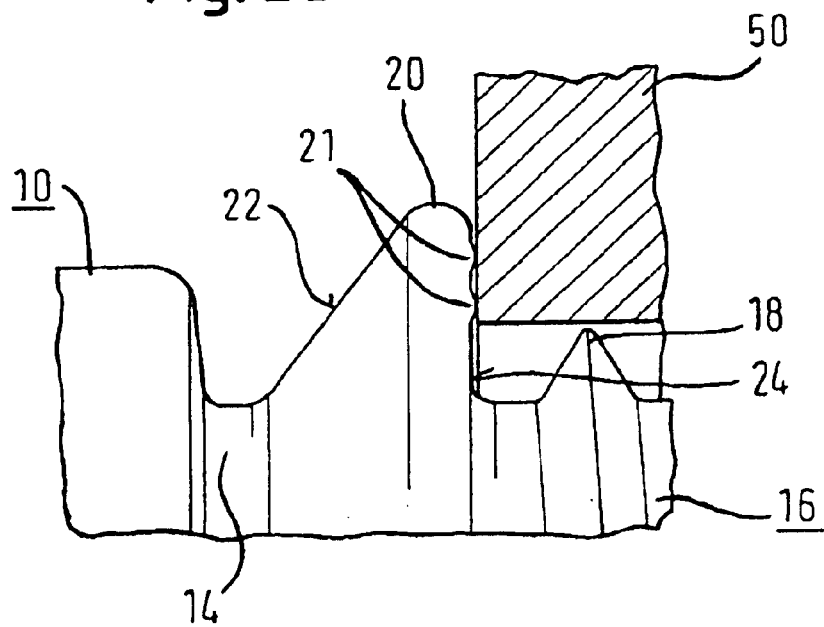
FIG. 2a illustrates a section according to FIG. 2 but in an advanced installation condition.
Figure 3:
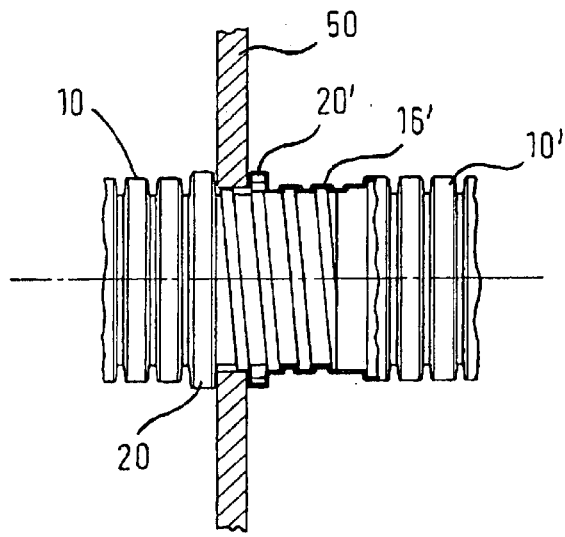
FIG. 3 shows a further embodiment according to the invention in an illustration corresponding to FIG. 1.

A corrugated pipe constructed in accordance with the invention, as illustrated, for example, in FIGS. 1 to 2a, whereby only the abutment portion 20 is constructed differently, is fastened according to FIG. 3 to the wall 50 by way of a locking further corrugated pipe 10' according to the invention which is screwed onto the corrugated pipe 10. The corrugated pipe 10' thereby has an inner thread, which is screwed onto the outer thread of the pipe 10. The inner threaded portion 16' has an abutment portion 20' at its end directed away from the pipe section. In this manner, the wall 50 or the edges thereof can be enclosed between the abutment 20 and the abutment 20' so that the two pipes 10, 10' are connected with one another on the one hand and at the same time a fastening within the opening of the wall 50 occurs.

In case a kinking of the pipes must be expected, the corrugations close to the wall 50 can be constructed in such a way that they provide the corrugated pipe with special flexibility.

On the other hand, if especially sensitive parts, for example glass fibres or the like are to be guided through such pipes, the corrugations close to the wall can also be provided with special stiffness which is especially in danger of kinking, so that the corrugated pipe in accordance with the invention can only be bent over a longer distance, which means has a larger bending radius, in order to preserve in this way also sensitive cables such as, for instance, fibre optic cables.

Figure 5:
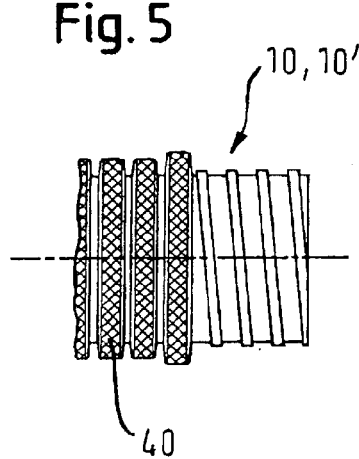
FIG. 5 shows in side elevation a further embodiment with features according to the invention.

A further preferred embodiment of the corrugated pipe in accordance with the invention is illustrated in FIG. 5. In order to enable a worker to generate the forces necessary for a tightening of the thread, a corrugated pipe 10, 10' can be provided with a knurled structure which of course must be machined into the forming dies.

Figure 4:
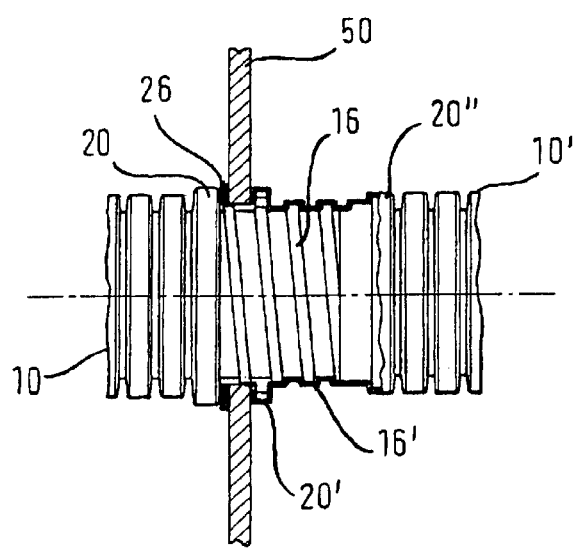
FIG. 4 illustrates the embodiment of FIG. 3 but with additional sealing measures.

In FIG. 4, only a sealing washer 26 is provided in addition to FIG. 3 behind the abutment 20 of the corrugated pipe 10. Such a seal can of course also be provided behind the abutment 20', which means between the latter and the wall 50, in order to provide additional sealing.

An embodiment in accordance with the invention is illustrated in FIG. 6 in which in the region of the fastening portion, an abutment portion 20 is provided in conventional manner at the end of the corrugated pipe section 10. Beyond a union portion 102, a fastening structure 120 is provided which in latching manner can be guided through the opening in the apparatus portion 50. Beyond the opening in the apparatus portion 50, a securing device 130 is snapped over the holding structure 120 which also in axial direction of the pipe 10 exerts an axial holding force by way of an engagement profile, so that the pipe 10 can no longer be torn out of the opening in the apparatus 50. The securing device, here a C-shaped locking element, for instance a snap ring, additionally provides a radial holding effect in that the locking device 130 has a smaller opening cross-section than the diameter of the pipe 10 in the region of the union 102.

A fast and simple connection can be achieved in this manner which is safe even with respect to large tension forces.

An installation situation is illustrated in FIG. 7 by the apparatus portion 50, whereby the part with features according to the invention which is to be inserted into the opening of the portion 50 is circumferentially provided with latching detents 100 which form an interrupted latching lip. When the pipe with its union 102' is advanced through the opening in the apparatus portion 50, the latching structures 100 are inwardly deflected and, once they have exited the other side of the opening again expand and fasten the pipe in the opening.

A further embodiment with features according to the invention is apparent from FIG. 8, whereby circumferentially continuous latching structures 100a, 100b, 100c, 100d are provided, which however can also be formed only as partially circumferential latching structures according to FIG. 7. Each of the latching structures is associated with a union portion 102a, 102b, 102c, 102d, which is adapted to the diameter of an axially preceding latching structure in such a way that a following latching structure can function as abutment. It is possible with this construction to simultaneously cover with only one corrugated pipe embodiment a multitude of diameters of the opening in the apparatus 50, for instance a switch gear cabinet.

What is claimed is:

1. A corrugated plastic pipe comprising a one piece pipe having at least one plastic wall, at least one corrugated pipe section with corrugation valleys and corrugation peaks, a fastening section on at least one side of the corrugated pipe section and an abutment portion formed on the pipe between the endmost corrugation and the fastening section; wherein the fastening section and the abutment portion are such that a wall is readily received between the abutment portion and the fastening means, whereby the wall abuts the abutment portion and the fastening means.

2. The corrugated plastic pipe according to claim 1, wherein the fastening section is a threaded section with at least one of an inner and an outer thread.

3. The corrugated plastic pipe according to claim 1, manufactured integrally and continuously in a corrugator.

4. The corrugated plastic pipe according to claim 1, wherein the abutment portion has a stabilizing structure on a side directed away from the threaded section.

5. The corrugated plastic pipe according to claim 4, wherein the stabilizing structure is an added material concentration which is added starting from the abutment portion towards the corrugated pipe section.

6. The corrugated plastic pipe according to claim 5, wherein the stabilizing structure is added continuously or discontinuously.

7. The corrugated plastic pipe according to claim 4, whereby the abutment portion, on the side of the threaded section, has a flat engagement portion.

8. The corrugated plastic pipe according to claim 7, wherein the abutment portion includes at least one circumferential elevation.

9. The corrugated plastic pipe according to claim 4, wherein a thread shape of the threaded section is selected from the group of a round thread, a pointed thread, a trapezoid thread, a metrical thread and an imperial thread.

10. The corrugated plastic pipe according to claim 1, wherein a non-slip gripping structure is provided on the outer circumference of the corrugated pipe section adjacent the fastening section.

11. The corrugated plastic pipe according to claim 1, wherein the fastening section has an exterior threaded portion, and further including a second corrugated pipe section having a threaded section constructed as an interior threaded section for screwing onto the exterior threaded portion of said at least one corrugated pipe section.

12. The corrugated plastic pipe according to claim 1, further comprising multiple plastic layers of which at least one is corrugated.

13. The corrugated plastic pipe according to claim 12, having a smooth walled inner plastic layer.

14. The corrugated plastic pipe according to claim 1, wherein the corrugated plastic pipe has a longitudinal slit in the region of the corrugated pipe section.

15. The corrugated plastic pipe according to claim 14, further comprising at least one of a continuous closing device and an interrupted closing device along the slit for at least partially closing the slit.

16. The corrugated plastic pipe according to claim 1, wherein the corrugated pipe section is constructed especially flexible in a region adjacent to the fastening section.

17. The corrugated plastic pipe according to claim 1, wherein the corrugated pipe section is constructed especially stiff in a region adjacent to the fastening section.

18. The corrugated plastic pipe according to claim 1, wherein subsequent to corrugation, the fastening section is provided by one of friction welding and gluing.

19. The corrugated plastic pipe according to claim 1, wherein the fastening section includes a holding structure for securing with a securing device which engages the holding structure, the holding structure being selected from the group of a C-shaped locking element, a snap ring and a helical spring.

20. A process for the manufacture of a corrugated pipe comprising a one piece pipe having at least one plastic wall, at least one corrugated pipe section with corrugation valleys and corrugation peaks, and a fastening section at least on one side of the corrugated pipe section, by way of continuous corrugation, comprising the steps of:
   a) continuously extruding a thermoplastically deformable tube with at least one plastic layer;
   b) guiding the continuous thermoplastically deformable tube into a molding path of a corrugator, in which molding dies which form the fastening section are inserted into circulation molding die chains.

21. The process according to claim 20, wherein in a region of the tube which is intended for the formation of the fastening section, more plastics material is supplied by way of at least one of short term coextrusion and temporarily slowing down the corrugator.

22. The process according to claim 20, wherein the forming dies are inserted at any location into the die chains for molding of the threaded sections.

23. The process according to claim 22, wherein the forming dies are removably inserted.

24. The process according to claim 20, wherein the continuously produced corrugated plastic pipe is cut in the regions of the threaded sections.

* * * * *